Patented May 31, 1938

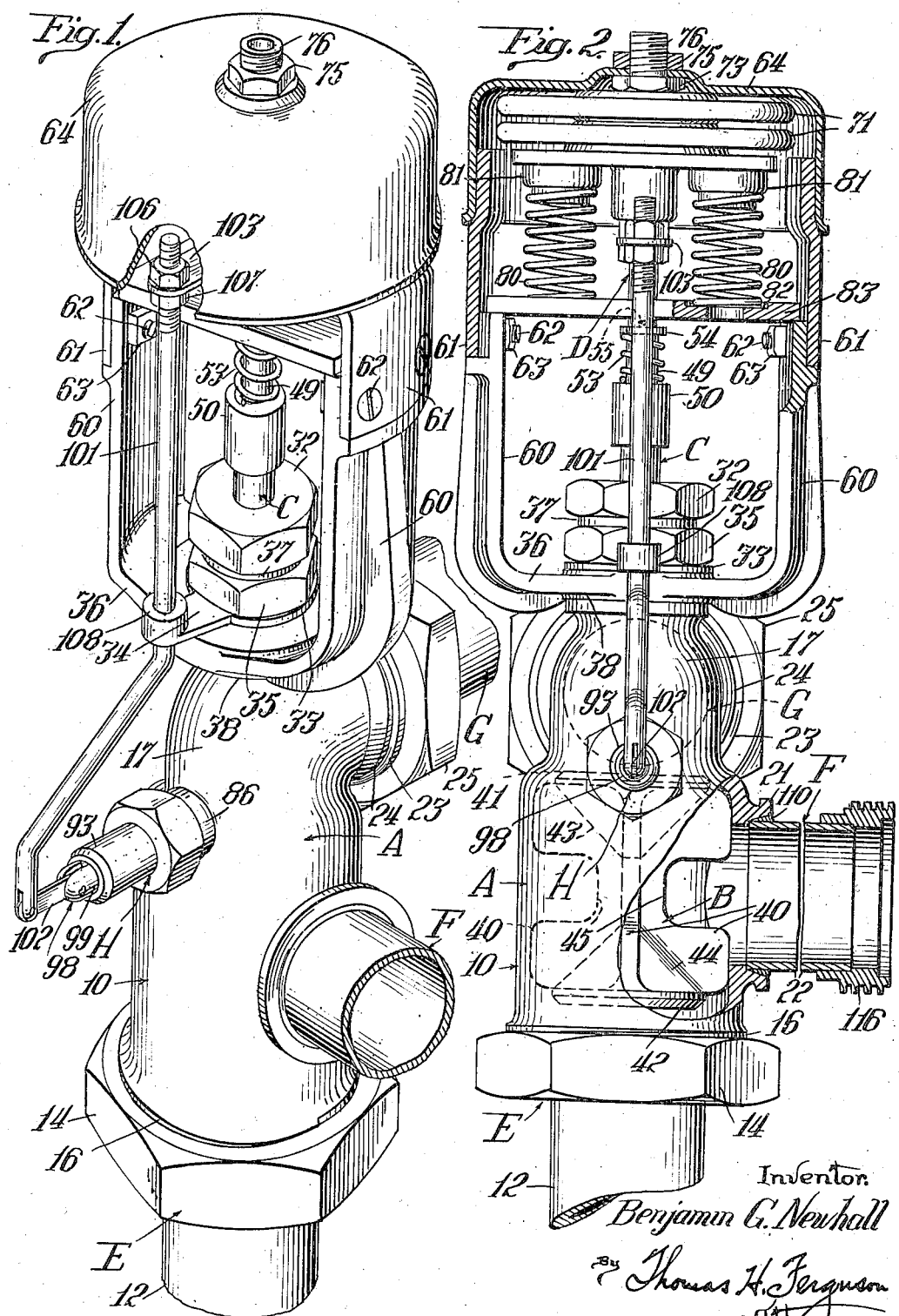

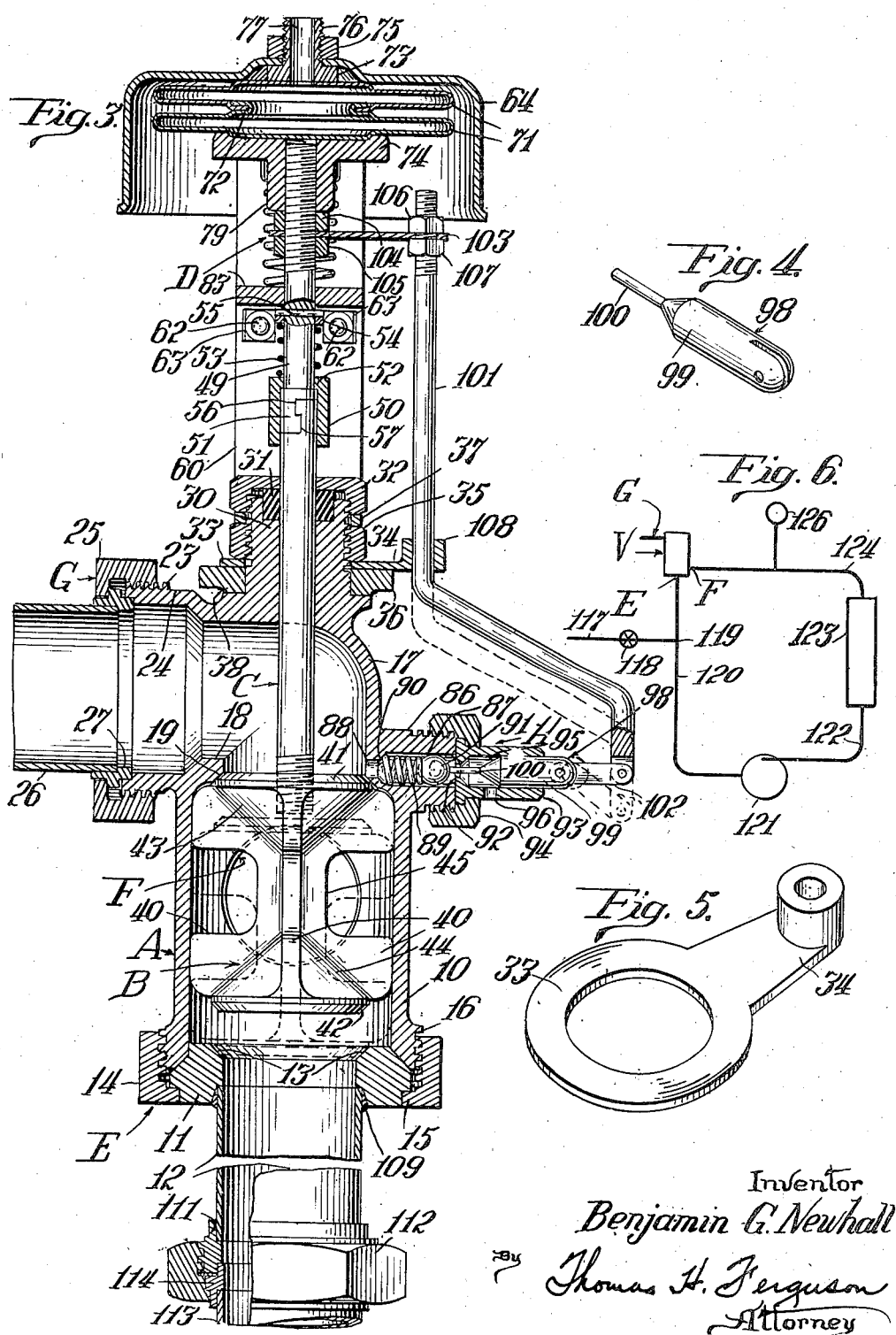

2,118,858

UNITED STATES PATENT OFFICE 2,118,858

FLOW DIVERSION VALVE

Benjamin G. Newhall, Forest Park, Ill., assignor to Mojonnier Bros. Co., a corporation of Illinois Application May 25, 1937, Serial No. 144,708

2 Claims. (Cl. 277—20)

The present invention relates to valves generally and more particularly to valves which require frequent disassembly for cleaning purposes. Such valves are commonly used in places where milk and milk products are conveyed through pipes and all must be cleaned periodically to meet the requirements of the sanitary laws relating to such matters. But obviously the valves may be of service in handling other liquids or fluids. And the use of the new valve may be quite general and not restricted to special liquids. For the purposes of the present disclosure the valve chosen is a so called flow diversion valve. In the use of such valves, a flow is established in a given circuit and continued therein until a definite change in the condition of the fluid or liquid is reached, whereupon the valve operates to change the direction of flow so as to divert the same into a new path. Some of the features of novelty in the present valve are not limited to a flow diversion valve while others are especially suited to such valves.

One object of the invention is to provide a valve of such construction that the pipe connections may be readily removed and cleaned while the interior movable valve member, which constitutes the valve proper, may be removed from the body of the valve for a like purpose after having its stem disconnected from the valve operating elements.

Another object is to provide novel means for draining the valve of liquid which should be removed from the valve and its connections, because, due to the operation of the valve, the same is not in proper condition to be passed on beyond the valve to the next apparatus.

Another object is to so construct the drain valve by which the surplus liquid is drawn off, that it too may be readily separated from the main valve and divided into its various parts for the purpose of ready cleaning.

Another object is to provide a valve which shall be simple in construction, efficient in operation and economical to manufacture and maintain.

These and other objects and advantages of the invention will be more fully understood upon reference to the following detailed description taken in connection with the accompanying drawings while the scope of the invention will be particularly pointed out in the appended claims.

In said drawings, Fig. 1 is a perspective view of a valve constructed and arranged in accordance with the present invention. Fig. 2 is an elevation of the same showing portions broken away and in vertical sectional elevation. Fig. 3 is a central vertical section through the valve structure taken on a plane at right angles to that on which the section of Fig. 2 is taken. Fig. 4 is a perspective view of an actuating ram forming part of the structure of the drain valve. Fig. 5 is a perspective view of a guide member employed in directing the movement of the actuating rod of the drain valve. And Fig. 6 is a diagram illustrating the way in which the valve of the preceding figures may be connected up in a flow diversion system. Throughout these views like characters refer to like parts.

In brief, the valve comprises a body A, a main valve B, a main stem C, actuating mechanism D, lower pipe connections E, lateral pipe connections F and G, and the auxiliary drain valve H. When the valve B is in its uppermost position, as the parts are shown, the flow of liquid through the valve is by way of the pipe connections E and F. When the valve B is in its lowermost position then there is no flow to the connections E but whatever flow there is must be by way of the connections F and G. Obviously, the direction of flow may be varied in different systems.

Having in view the various parts of the valve and connections and their relative arrangements, these various parts may now be considered in detail.

The body A includes a cylindrical portion 10 which for convenience is shown in the drawings as arranged with its cylindrical axis vertical. It is within this cylindrical portion 10 that valve B travels. The lower end of the cylindrical portion 10 is closed in part by a ring 11 which is removably secured in place. The ring 11 is provided with a central aperture of a size suited to the pipe 12 of the connections E. Around the upper edge of this aperture is a beveled valve seat 13. This seat cooperates with the lower portion of the main valve B. The ring 11 is preferably held in place by a threaded clamping nut 14, the same having an overhanging flange 15 which cooperates with a shoulder upon the ring to firmly hold the ring in place when the nut is screwed home upon the lower portion of the cylinder 10. As clearly shown, the outer surface of the portion 10 is provided with a suitable thread 16 which cooperates with the thread on the interior of the nut 14.

The upper portion of the body A takes the form of an elbow 17. In passing from the interior of the cylinder 10 to the interior of the elbow 17 an inwardly extending flange or projection 18 is encountered. This flange surrounds a passage which is similar to that provided by the ring 11 and the lower edge of the flange is beveled so as to provide a valve seat 19 which, like the valve seat 13, cooperates with the main valve B, but this time with the upper portion thereof.

One wall of the cylinder 10 is apertured for the pipe connections F. In this case the opening in the cylinder wall is surrounded by an annular flange 21. It is within this flange that the end of the pipe 22 is fitted.

In a somewhat similar way the open end of the elbow 17 is constructed so as to care for the pipe connections G. In this case the parts are secured together somewhat differently than in the connections F. Here an exterior thread 23 on a tubular extension 24 cooperates with the interior threads on a nut 25 to hold the pipe 26 in place. In this instance a flange ring 27 is soldered or otherwise firmly secured to the end of the pipe 26. The flange on the ring 27 cooperates with the inwardly extending flange on the nut 25 to firmly seat the ring 27 against the end of the tubular portion 24. In this way the pipe connections G are formed. Obviously the connections at this point may be different.

That portion of the body A which lies above the elbow 17 is in the nature of an apertured plug 30. The main valve stem C passes through the aperture thus formed and is reciprocated therein to operate the main valve B. The body portion 30 is socketed at its upper end for the reception of a suitable packing ring 31. The packing material employed may be varied as judgment may dictate but in the present instance it is shown as comprising a ring of rubber or like resilient material. The exterior of the portion 30 is threaded and a nut 32 serves as a gland which when screwed home firmly holds the packing 31 in place and presses the same with proper pressure against the stem C.

In this instance the portion 30 of the valve body also receives the apertured end 33 of the guide member 34, shown particularly in Fig. 5. A nut 35 overlies the ring 33 and presses it down against the upper face of the central portion of a yoke 36 which in turn bears upon a suitable annular shoulder 38 formed upon the body portion 30. By screwing the nut 35 down tight upon the ring 33, the guide member 34 is firmly held in place. Not only is this so but the yoke 36 is also secured in proper relation to the body of the valve. If desired a washer 37 may be positioned between the nuts 32 and 35. Considerable variations in details may be had in this packing ring and yoke supporting construction without departing from the scope of the invention.

The valve B may next be considered. It comprises four wings 40 which extend outward from the axis of the valve. These wings bear at their outer edges against the interior surface of the cylindrical portion 10 of the body A. At the upper end of the valve body is a circular valve face 41. Similarly at the lower portion of the body is a like valve face 42. The length of the valve B between the faces 41 and 42 is somewhat less than the length between the cooperating seats 13 and 19 formed by the main valve body. The engaging faces 41 and 42 of the valve are located at the bases of conical portions 43 and 44. The structure is such that when the valve face 41 engages the seat 19, as shown in Fig. 3, the passage between the connections F and G is closed. At the same time that the valve face 41 engages the valve seat 19, the valve face 42 is out of engagement with the seat 13 and some distance from it. This provides a communicating passage between the pipe connections E and F. The wings 40 are preferably cut away near their centers, as indicated at 45, and they extend at their outer extremities some little distance beyond the peripheries of the valve engaging faces 41 and 42. As a result of this construction, the passage between the connections E and F or between F and G provides ample cross sectional areas for the stream of liquid passing through the valve. The valve B is secured to the lower end of the stem C in any suitable way. As shown, the upper end of the valve B is provided with a threaded socket into which the lower end of the stem C is threaded to connect the parts together. The valve B is moved to and fro by the valve stem C. As clearly shown, the stem C is axially alined with the valve B and this alinement agrees with the axis of the cylindrical portion 10 of the body A.

As before pointed out, the valve stem C extends through the axially alined aperture in the portion 30 of the body A. As also previously pointed out, the gland 32 is pressed down upon the packing 31 only with sufficient force to maintain a tight joint around the stem without interfering with the reciprocations of the latter which are necessary for the operation of the valve B.

Obviously, the valve stem C may be reciprocated in different ways. In some instances it may be sufficient to reciprocate the same by hand. In other instances it may be desirable to reciprocate it by power actuated mechanism. It is the latter method that is illustrated in the present case. The actuating mechanism D includes several parts. Among these is a supplemental stem 49 which is in vertical alinement with the main stem C. When the parts are assembled and in readiness for operation, the stems C and 49 are coupled together by a coupling sleeve 50. As clearly shown, the upper end of the stem C is of practically the same diameter as the interior surface of the greater portion of the sleeve 50. This means that the sleeve will readily slip over the end of the stem C. The stem 49 has at its lower end a head 51 which has the same diameter as the upper end of the stem C. This head 51 therefore, moves freely within the sleeve 50. The upper end of the sleeve 50 is provided with an inwardly projecting flange 52. This flange cooperates with a shoulder upon the adjacent end of the head 51 and is thus limited in its downward movement. In other words, the sleeve 50 may be moved up and down on the stem 49 through a limited range of movement. Its downward movement is limited by the head 51 and its upward movement is stopped when the spring 53 surrounding the stem 49 is fully compressed. The latter, as clearly shown, engages the flange 52 of the sleeve 50 at its lower end and at its upper end engages a washer 54 which is held against displacement by a transverse pin 55 which extends through and fits snugly in an aperture in the stem 49. The head 51 of the stem 49 and the upper end of the stem C have interlocking portions 56 and 57. These interlocking portions are such that the two stems can be separated from each other only by lateral movement. Such movement is prevented by the sleeve 50 when the parts are in normal assembled relation. In order to uncouple the stems, it is necessary to force the sleeve 50 upward against the compression of the spring 53 until said sleeve occupies a position with its lower end clear of the upper end of the stem C. When in this position, the two stems may be moved laterally a sufficient amount to uncouple them. The fit of the stems and their resiliency is sufficient to permit this. Obviously, the engaging portions 56 and 57 upon the stems 49 and C may be variously formed. The interlocking surfaces illustrated are therefore merely typical.

Turning again to the actuating mechanism D, it will be noted that the yoke 36 terminates in two upstanding arms 60. To these are secured two extension pieces 61. Suitable bolts 62 and nuts 63 cooperate in holding the pieces 61 in place upon the yoke arms 60. In turn, the pieces 61 carry at their upper ends the cap 64. As shown, the cap is beveled at its lower outer edge so as to fit over a similar tapered surface formed at the upper ends of the pieces 61. The cap 64 must be firmly secured to these extension pieces in any suitable way. The parts may be soldered, welded or otherwise secured. The connection must be a strong one as the strain produced by the enclosed bellows and springs must be taken up by the connected parts.

The bellows within the cap 64 is made up of two metal sections 71 which are fitted together with an inner circular joint 72 and comprise outer folded portions which are separable to provide the bellows action. The upper wall of the upper section is secured to a fixed head 73 and the lower wall of the lower section is similarly secured to a movable head 74. The fixed head has a stem 76 which extends through an aperture in the center of the cap 64 and is held in place by a nut 75 which has threaded engagement with the threaded exterior of the stem. The head 73, the stem 76, and the adjacent wall of the bellows section 71 are provided with an aperture 77. Through this aperture compressed air or the like may be supplied to the interior of the bellows sections.

The upper and lower walls of the bellows sections may be secured to the heads 73 and 74 in any desired way. Thus, they may be soldered or welded. Obviously, the stem 76 may be connected by suitable tubing to a source of supply of air under pressure or the like. Such supply may be regulated by any suitable means either automatic or manual. Ordinarily, automatic control of some sort is employed. The head 74 is located at the upper end of the auxiliary stem 49, as clearly shown. A preferred construction is one in which the upper end of the stem 49 is threaded into a suitable threaded opening in the shank 79 of head 74. Obviously, when air under pressure is admitted to the interior of the bellows the head 74 will be moved away from the head 73 and the result will be that the stems 49 and C will be moved downward. When the pressure is sufficient, the movement will be such as to completely open the valve face 41 and completely close the valve face 42. The bellows expansion is counteracted by a pair of coiled compression springs 80 which fit over nubs 81 located on the under side of the head 74 on opposite sides of its central axis. The opposite ends of the springs 80 rest in sockets 82 formed in the upper face of a cross bar 83 which is supported at its ends upon the upper ends of the arms 60 of the yoke 36. With this construction it will be apparent that as soon as the pressure within the bellows is relieved the springs 80 will operate to force the head 74 upward. The result of such movement will be to carry the valve B upward so as to open the same at seat 13 and close it at seat 19. The cross bar 83 may be permanently secured to the yoke arms 60 if desired.

Considering now the auxiliary valve H, by which the main valve is drained under certain conditions of operation, it may be noted that the body of the main valve is provided with a projection 86 in which there is a chamber 87 having a port 88 which opens into that chamber of the main valve which lies just above the seat 19. Indeed, it may be said that the port 88 opens at the seat 19. Within the chamber 87 is a coiled spring 89 which bears at one end against a shoulder 90 formed adjacent to the port 88, and at its other end against a metal ball 91 which cooperates with a seat 92 to open and close the drain passage leading from the port 88. The seat 92 is formed at one end of a tubular member 93. This member is held in place by a clamping nut 94 which is threaded onto the exterior of the projection 86 and has a flange which cooperates with a flange upon the member 93 to hold the member 93 up tight against the end of the projection 86 and thus position the seat 92 in alinement with the ball valve 91 to bring about proper valve operation. The member 93 is provided with a central bore 95 which communicates with the similar bore or chamber 87 of the projection 86 through the valve opening at the seat 92. Thus, the chamber 95 is open to the interior of the main valve above the seat 19 whenever the valve 91 is open and is cut off from such communication whenever the valve 91 is closed. In this instance, the bore 95 is directly open to atmosphere through the port 96. By reason of the arrangement described, it therefore follows that the ball valve 91 controls a passage to atmosphere from the chamber of the main valve above the seat 19 at all times. When the valve is open the chamber will be drained; and when the valve is closed there will be no drain connection to the chamber but the latter will be otherwise used. All liquid in the chamber above the valve B can be thus drained from the main valve.

Obviously the valve 91 may be operated in different ways. In some cases it may suffice to operate this valve by hand. In other cases automatic operation will be desirable. In the present instance the valve 91 is shown as operated automatically in response to movements of the main valve B. To bring about this operation, the interior 95 of the member 93 is fitted with a ram 98. This ram has a portion 99 of large diameter which exactly fits within the bore 95 and it also has a pinlike projection 100 which is adapted in operation to pass through the opening of the valve adjacent to the seat 92 and press upon the ball valve 91 to move it in opposition to the coiled compression spring 89. The spring is used to close the valve and the pin 100 and associated ram 99 work in opposition to the spring to open the valve.

The requisite movement for actuating the ram 98 is obtained from a reciprocating rod or member 101 which moves with the main valve stem C. As clearly shown, the member 101 may occupy two extreme positions, one being the upper full line position of Fig. 3 and the other the lower dash line position of the same figure. When the rod 101 occupies said full line position, it acts through link 102 to force the ram 98 against the ball 91 to open the valve. When the member 101 occupies said dash line position, then it acts through link 102 to withdraw the ram 99 slightly and permit the spring 89 to press the valve 91 into closed position. In order to bring about movement of the member 101 with the main stem C and the associated stem 49, the latter carries a laterally projecting arm 103. This arm is secured to the stem 49 by associated nuts 104 and 105 threaded upon the stem and engaging opposite sides of the arm 103. The outer end of the latter arm is provided with an opening for the passage of the upper end of the member 101. The latter is threaded at its upper end and passes through the opening in the end of the arm. The parts are held in place by cooperating nuts 106 and 107 threaded upon the rod 101 and bearing upon opposite sides of the arm 103. The rod 101 is guided in its up and down movement by the guide member 34 previously described as supported upon the body portion 30. As clearly shown, the outer end of the guide member 34 has an apertured boss 108. The rod 101 extends through the aperture in said boss and is free to move up and down therein. Thus, the movements of the member 101 are maintained in proper alignment.

Obviously, in making up the pipe connections E, F and G, various arrangements of pipes and coupling members may be resorted to. Those illustrated suggest possibilities along this line. In the case of the connections E the pipe 12 abuts against a shoulder in the ring 11 and solder 109 fills in the space between the end of the pipe and the adjacent inclined wall of the opening. The same construction is employed in connecting the pipe 22 to the flange extension of the pipe connections F. In the latter case, solder 110 fills the space surrounding the end of the pipe 22. Again, returning to the connections E, it will be seen that the pipe 12 is provided with a threaded ring 111. A clamping nut 112 cooperates with the ring 111 to secure the pipe 113 in place. In this instance pipe 113 requires the presence of ring 114 similar to the ring 27 previously described in connection with the description of the pipe connections G. It should be noted too that the pipe 22 of connections F is provided at its outer end with an exteriorly threaded ring 116 like the ring 111 of connections E.

It will be observed that, in the case of these various pipe connections, the couplings are such that the pipes may be readily disconnected from each other or from the valve body A in order that the same may be readily and efficiently cleaned. In an instance where the pipe is permanently connected to the valve body, as in the case of the pipe connections F, the pipe thus connected will be ordinarily of short length or otherwise constructed so that full access may be had to all parts, especially the interior of the casing 10, for cleaning purposes.

It will also be apparent from all that has been said, that the removal of the valve seat ring 11 will leave the cylindrical portion 10 of body A entirely open. When thus opened up, the valve B may be readily removed from the valve body. This will be accomplished by slipping back the coupling sleeve 50 and separating the main and auxiliary valve stems and then simply withdrawing the valve B and stem C from the body A. Obviously, too, the clamping nut 94 may be removed from the lateral projection 86 and the various parts of the drain valve mechanism H may be readily removed for cleaning purposes.

In order to give a fuller understanding of the use of a flow diversion valve and to make clear the advantage of the auxiliary valve for draining out the main valve and connections, a diagram of a possible installation is presented. This is found in Fig. 6. As there shown, the valve I have been describing is designated V and the pipe connections E, F and G are indicated by the corresponding letters. In this diagram, an installation for heating a liquid in a given circuit, and then, when it has reached a certain temperature, diverting it to other apparatus is indicated. The liquid supply comes through pipe 117 controlled by a valve 118. The liquid passes into a circuit which is initially established by having the valve V in the position shown in Fig. 3. This circuit may be traced from the point 119, where the liquid enters, through pipe 120, pump 121, pipe 122, heater 123 and pipe 124 to the connection F, thence through valve V and out through connection E back to the point 119. A thermometer 126 is connected to the line 124. Normally the liquid under treatment is passed into the circuit from the pipe 117, under the control of the valve 118. The pump 121 operates to keep the liquid traveling around the traced circuit. As it passes through the heater 123, it takes up heat. The circuitous travel is continued until the thermometer 126 shows that the liquid has been brought to the desired temperature for diversion to other apparatus. When this point is reached, the valve V is operated to take the position alternative to that shown in Fig. 3, namely, the position in which the valve face 42 is closed upon seat 13 and the valve face 41 is open. At this time the liquid, which has been traveling around the circuit, obviously discontinues travel over such path since it cannot now leave the valve by the connection E but must leave by way of the connection G. The continued action of the pump forces the properly heated liquid on through the connection G to the apparatus intended. Now as the liquid is being thus forwarded through connection G new liquid will come into the system through supply pipe 117 and the temperature of the liquid within the circuit will be gradually lowered until finally it will be necessary to cut off the connection G and again establish the previously traced circuit through connections F and E. This is accomplished by an operation of the valve which brings it into the position shown in Fig. 3. Now, it will be noted that when this return of the valve to the position of Fig. 3 occurs, the drain valve H will be opened and any liquid which may be in the interior of the valve above the seat 19 or in the connection leading therefrom through the pipe connection G, will be drained off through the port 96. This is a matter of considerable importance where great nicety of temperature control is required. Although these valve operations have been set forth merely as accomplished as if done by hand, yet it will be understood that in commercial installations where there is to be great nicety of control, the regulation of the valve will be brought about wholly by automatic instruments capable of detecting the slightest changes in temperature or other controlling conditions. Where such is the case, the need of draining off liquid from the valve, where such liquid has fallen off slightly from the required conditions, is of great importance. By draining off the chamber and connections leading to apparatus which must be so delicately handled, great nicety of control and good results in operation are obtainable. This is especially true in the flash pasteurization of milk in connection with the development of which the present valve has been devised and developed.

In constructing the valve disclosed, all the parts except where otherwise indicated are composed of metal. And where milk and milk products are to be handled, the metal of all those parts which actually engage the milk are composed of some metal especially suited to use with milk. Such metals are stainless steel, stainless iron and the like, there being several metals of this kind on the market under different trade names.

It should also be pointed out that all the connections E, F, G and the like are such that the valve interior is devoid of screw threads. In other words, I have produced a valve which has a threadless interior. This makes the same especially useful because so easily cleaned. When disassembled all the parts may be thoroughly cleaned. The interior walls of the main valve casing are smooth, well rounded, and entirely free from crevices, there being no interior screw threads or the like, and consequently they lend themselves readily to all sanitary requirements. The provision of a threadless interior is of prime importance and a valuable feature of my invention.

The illustration furnished by the diagram is merely suggestive of one use to which the valve may be put. Obviously, it may be used in quite a variety of circumstances, and obviously, too, there may be a number of alterations and modifications introduced into the specific structure illustrated without departing from the spirit and scope of the invention. It is therefore aimed to cover by the terms of the appended claims all those uses and alterations and modifications which rightly come within the scope of the invention.

I claim:—

1. A valve structure including a body, suitable openings and passages therein for the flow of liquid therethrough, readily removable sanitary pipe connections to said body cooperating with said openings and passages in said flow, said openings and passages including a cylindrical chamber, valve seats formed at the opposite ends of said chamber, the seat at the outer end of said chamber being removable from said body to leave a removal opening having the full width of said chamber, a reciprocating valve member operative in said chamber, said member having guiding wings and two valve faces, said wings operating in engagement with the cylindrical wall of said chamber to insure axial guidance of said valve member, said valve faces being operative to alternately engage said seats respectively as said member is reciprocated, said valve member when in one seat-engaging position directing said flow of liquid in one path and when in the other seat-engaging position directing said flow in another path through said body openings and passages, a main stem for said valve secured thereto at one end and extending axially of said cylindrical chamber out through an opening in said body, a supplemental stem outside of said body and extending axially of said main stem and available as an extension of the same, actuating mechanism for reciprocating said supplemental stem and said main stem when said stems are coupled together, a coupling member for temporarily connecting said stems together end to end for movement under said actuating mechanism, and removable packing means for providing a tight joint around said main stem where it emerges from said body, said valve member being separable from said main stem and removable from said body through said removal opening, provided as aforesaid by the removal of said outer valve seat, and said main stem being separable from said supplemental stem and readily removable from said body, whereby said liquid openings and passages in said body are made accessible so that they may be thoroughly scrubbed and cleaned and rendered sanitary for the handling of edible liquids.

2. A valve structure including a body, suitable openings and passages therein for the flow of liquid therethrough, readily removable sanitary pipe connections to said body cooperating with said openings and passages in said flow, one of said pipe connections extending approximately horizontally, another approximately vertically, the latter including a cylindrical chamber having a substantially vertical axis, valve seats formed near the upper and lower ends of said cylindrical chamber, the upper seat lying in an upper valve seat plane just below the inner end of said approximately horizontal pipe connection and passage, the lowest point in said latter connection and passage being adjacent to said upper valve seat, the lower valve seat being readily removable from said body to leave a full-width removal opening at the lower end of said cylindrical chamber, a reciprocating valve member operatively positioned in said chamber, said member having guiding wings and two valve faces, said wings operating in engagement with the cylinder wall of said chamber to insure axial guidance of said valve member, and said valve faces cooperating with said seats to vary the path of flow of the liquid through said body, a main stem for said valve extending through an opening in said body and being removably connected to said valve, said valve and stem being both removable from said body through said removal opening at the lower end of said cylindrical chamber, means outside of said body for reciprocating said stem and attached valve, the latter in said cylindrical chamber, said body having a cylindrical drain passage opposite, and accessible for cleaning through, said substantially horizontally disposed fluid passage, said cylindrical drain passage terminating at its inner end practically in said upper valve seat plane, a drain valve in said cylindrical drain passage, a coiled spring in said passage normally holding said drain valve closed, a removable tube secured to said body and forming an extension of said drain passage, means in said tube for actuating said valve in cooperation with said spring, and mechanical connections between the main stem actuating means outside of said body whereby vertical movements of said main stem actuating means will produce corresponding horizontal movements of the actuating means in said removable tube to drain the horizontal passage and connections to a point outside said body whenever said upper valve face is closed on its said seat, the removability of said main valve, main valve stem, removable tube and associated parts, rendering the interiors of said body passages accessible for scrubbing to render them sanitary for the handling of edible liquids.

BENJAMIN G. NEWHALL.